US011428705B2

(12) United States Patent
Suzuki et al.

(10) Patent No.: US 11,428,705 B2
(45) Date of Patent: Aug. 30, 2022

(54) ANGULAR VELOCITY SENSOR AND ANGULAR VELOCITY SENSOR CONTROL METHOD

(71) Applicant: Panasonic Intellectual Property Management Co., Ltd., Osaka (JP)

(72) Inventors: Hirotsugu Suzuki, Ishikawa (JP); Kazuma Tsukamoto, Fukui (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 564 days.

(21) Appl. No.: 16/500,412

(22) PCT Filed: Apr. 9, 2018

(86) PCT No.: PCT/JP2018/014873
§ 371 (c)(1),
(2) Date: Oct. 3, 2019

(87) PCT Pub. No.: WO2018/193890
PCT Pub. Date: Oct. 25, 2018

(65) Prior Publication Data
US 2020/0191819 A1   Jun. 18, 2020

(30) Foreign Application Priority Data

Apr. 17, 2017   (JP) .............................. JP2017-081012

(51) Int. Cl.
*G01P 3/48*  (2006.01)
*G01P 3/483*  (2006.01)

(52) U.S. Cl.
CPC ............ *G01P 3/4802* (2013.01); *G01P 3/483* (2013.01); *G01P 3/4805* (2013.01)

(58) Field of Classification Search
CPC ....... G01P 3/4802; G01P 3/483; G01P 3/4805
See application file for complete search history.

(56) References Cited

U.S. PATENT DOCUMENTS

| 8,061,201 | B2 | 11/2011 | Ayazi et al. |
| 8,322,213 | B2 | 12/2012 | Trusov et al. |
| 2009/0071247 | A1* | 3/2009 | Konaka ................. G01P 15/125 73/504.14 |

OTHER PUBLICATIONS

International Search Report of PCT application No. PCT/JP2018/014873 dated Jun. 12, 2018.

* cited by examiner

*Primary Examiner* — Paul M. West
(74) *Attorney, Agent, or Firm* — McDermott Will & Emery LLP

(57) ABSTRACT

An angular velocity sensor includes an angular velocity sensor element, a drive circuit, a detection circuit, and a reference potential supply circuit. The angular velocity sensor element has a monitor electrode, a drive electrode, a sense electrode, and a weight. The reference potential supply circuit supplies a reference potential to the angular velocity sensor element. The reference potential supply circuit has a first CV converter, a second CV converter, a comparator, and a reference potential adjustment circuit. The first CV converter is connected to the monitor electrode. The second CV converter is connected to the sense electrode. The comparator compares a frequency of a signal being output from the first CV converter with a frequency of a signal being output from the second CV converter, and outputs a signal depending on a result of the comparison.

12 Claims, 9 Drawing Sheets

FIG.8

| PATTERN/SYMBOL | PART, COMPONENT NAME |
|---|---|
| ░░░ | MOVABLE PART |
| ▨▨▨ | FIXED PART |
| ─∿∿─ | SPRING 28 |

ANGULAR VELOCITY SENSOR AND ANGULAR VELOCITY SENSOR CONTROL METHOD

CROSS-REFERENCE TO RELATED APPLICATIONS

This application is a U.S. national stage application of the PCT International Application No. PCT/JP2018/014873 filed on Apr. 9, 2018, which claims the benefit of foreign priority of Japanese patent application 2017-081012 filed on Apr. 17, 2017, the contents all of which are incorporated herein by reference.

FIELD OF THE INVENTION

The present invention relates to an angular velocity sensor to be used for control of a vehicle or other purposes.

DESCRIPTION OF THE RELATED ART

Conventionally, there is known a sensor that employs control in which a drive frequency and a detection frequency are matched to each other (that is, mode-matching control) to provide a highly accurate angular velocity sensor. As a prior art document that provides such an angular velocity sensor, PTLS 1 and 2 are known, for example.

CITATION LIST

Patent Literatures

PTL 1: U.S. Pat. No. 8,061,201
PTL 2: U.S. Pat. No. 8,322,213

SUMMARY OF THE INVENTION

However, conventional sensors are insufficient to meet increasing demand for higher accuracy. Therefore, the present disclosure provides an angular velocity sensor that has improved accuracy or reliability.

In order to solve the above object, the present disclosure includes an angular velocity sensor element, a drive circuit, a detection circuit, and a reference potential supply circuit. The angular velocity sensor element has a monitor electrode, a drive electrode, a sense electrode, and a weight. The drive circuit applies an electric signal to the drive electrode to drive the weight. An electric signal generated by displacement of the weight is input to the detection circuit from the sense electrode. The reference potential supply circuit supplies a reference potential to the angular velocity sensor element. The reference potential supply circuit has a first CV converter (where C is a capacitance and V is a voltage), a second CV converter, a comparator, and a reference potential adjustment circuit. The first CV converter is connected to the monitor electrode. The second CV converter is connected to the sense electrode. The comparator compares a frequency of a signal being output from the first CV converter with a frequency of a signal being output from the second CV converter, and outputs a signal depending on a result of the comparison. The signal depending on the result of the comparison is input to the reference potential adjustment circuit, and the reference potential adjustment circuit outputs a signal to the first CV converter and the second CV converter.

The angular velocity sensor of the present disclosure has high accuracy and is therefore effective as an angular velocity sensor to be used for steering attitude control of a vehicle, for example.

BRIEF DESCRIPTION OF DRAWINGS

FIG. 8 is an explanatory diagram of a hatched part, a filled part, and a symbol representing a spring.

DETAILED DESCRIPTION OF THE PREFERRED EMBODIMENTS

Hereinafter, an angular velocity sensor in an exemplary embodiment of the present disclosure will be described with reference to the drawings.

Figure 1:
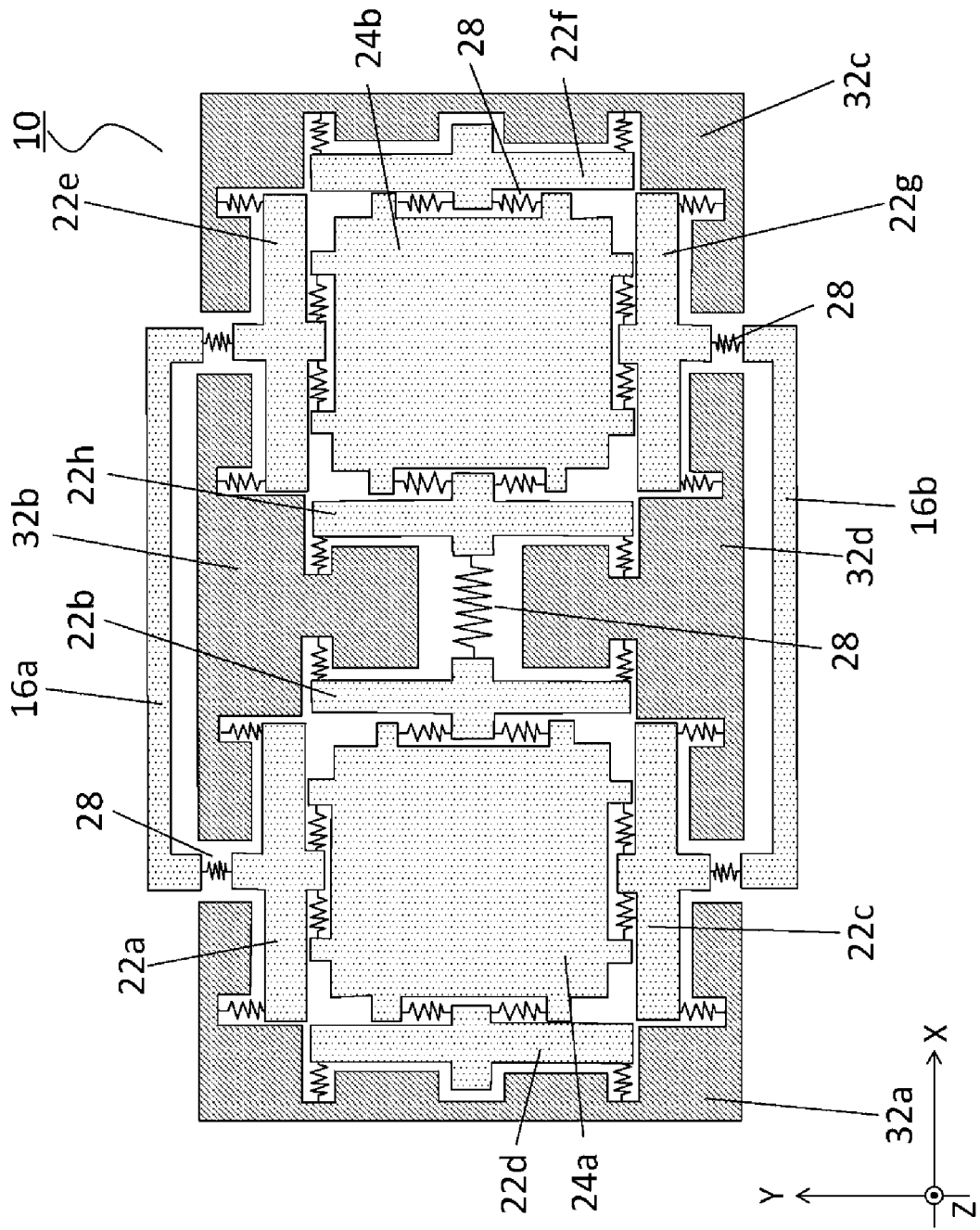
FIG. 1 is a diagram showing an angular velocity sensor element included in an angular velocity sensor of the present exemplary embodiment.
Figure 2A:
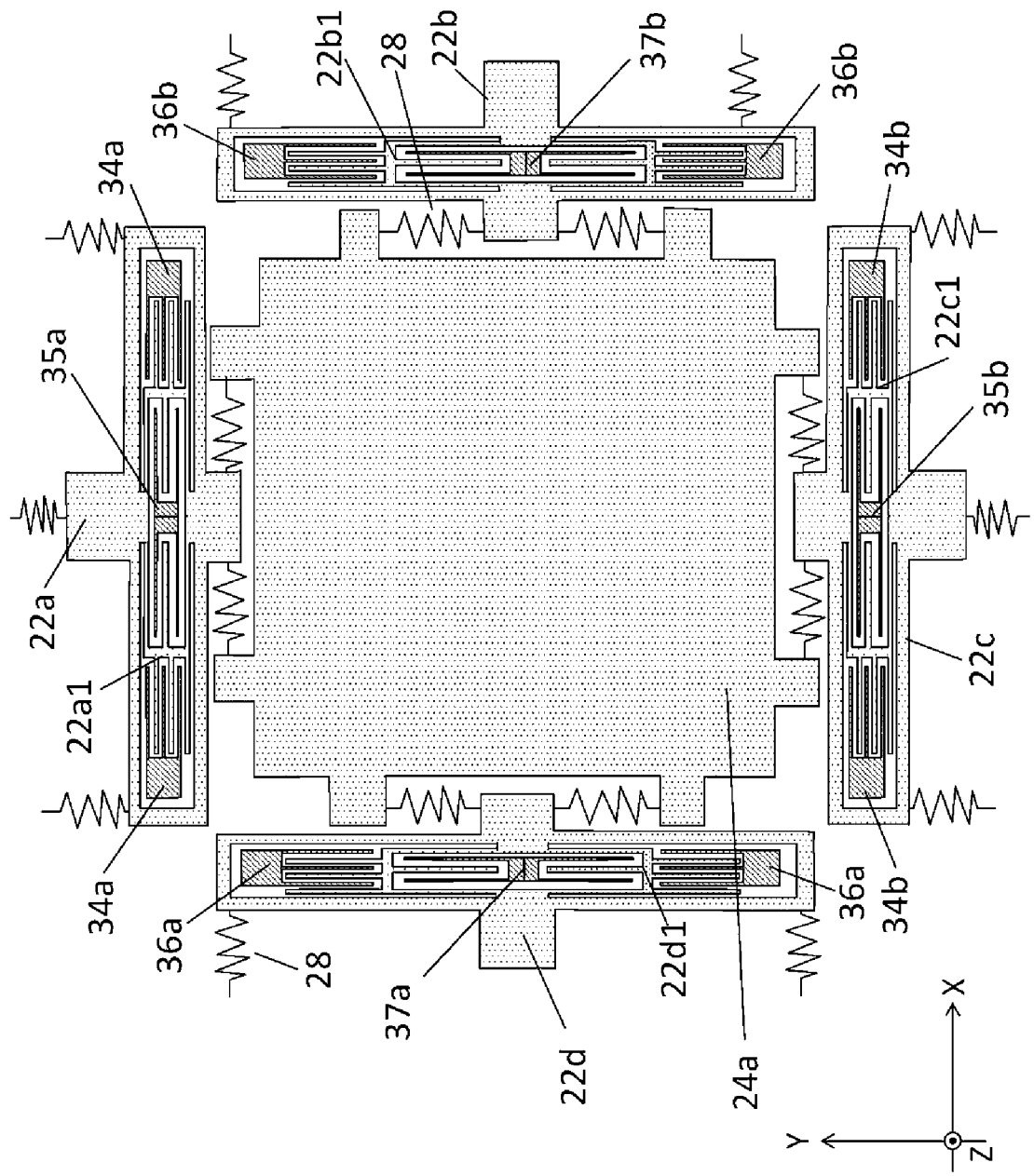
FIG. 2A is a partially enlarged view of FIG. 1.
Figure 2B:
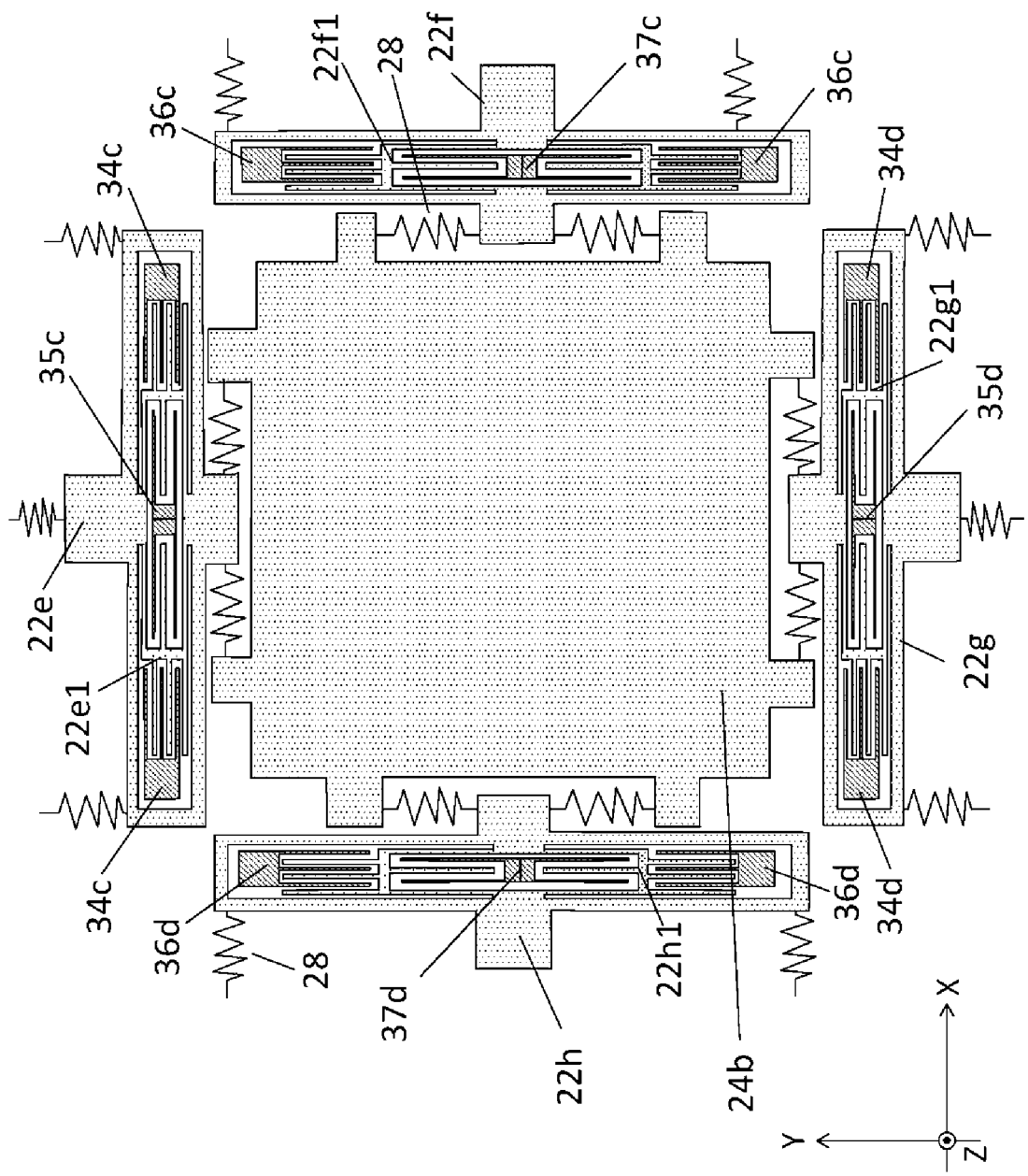
FIG. 2B is a partially enlarged view of FIG. 1

FIG. 1 is an upper surface view of angular velocity sensor element 10 included in an angular velocity sensor of the present exemplary embodiment. FIGS. 2A and 2B are each a partially enlarged view of FIG. 1. Note that, in FIGS. 1, 2A, and 2B, an upper lid included in angular velocity sensor element 10 is omitted for the sake of descriptive convenience. Note that, regarding the hatched parts, the filled parts, and the symbols representing springs 28 in FIGS. 1, 2A, and 2B are shown in FIG. 8.

Angular velocity sensor element 10 includes lever 16a, lever 16b, movable part 22a, movable part 22b, movable part 22c, movable part 22d, movable part 22e, movable part 22f, movable part 22g, movable part 22h, weight 24a, weight 24b, springs 28 (flexures), fixed part 32a, fixed part 32b, fixed part 32c, and fixed part 32d. Angular velocity sensor element 10 further includes drive electrode 35a, drive electrode 35b, monitor electrode 34a, monitor electrode 34b, sense electrode 36a, sense electrode 36b, sense drive electrode 37a, and sense drive electrode 37b. Note that monitor electrode 34a and monitor electrode 34b may be collectively written as monitor electrode 34. Drive electrode 35a and drive electrode 35b may be collectively written as drive electrode 35. Sense electrode 36a and sense electrode 36b may be collectively written as sense electrode 36. Sense drive electrode 37a and sense drive electrode 37b may be collectively written as sense drive electrode 37. Weight 24a and weight 24b may be collectively written as weight 24.

Lever 16a is connected to movable part 22a and movable part 22e via springs 28. Lever 16b is connected to movable part 22c and movable part 22g via springs 28. Lever 16a and lever 16b transfer vibration from weight 24a to weight 24b (or from weight 24b to weight 24a). With this arrangement, weight 24a and weight 24b vibrate (in a Y-axis direction) in the same phase or opposite phases to each other.

Movable parts 22a to 22d are connected to weight 24a via springs 28. Movable parts 22a to 22d are disposed to surround weight 24a.

Movable part 22a has comb-teeth part 22a1. Comb-teeth part 22a1 is disposed with constant gaps to drive electrode 35a and monitor electrode 34a.

Movable part 22b has comb-teeth part 22b1. Comb-teeth part 22b1 is disposed with constant gaps to sense electrode 36b and sense drive electrode 37b.

Movable part 22c has comb-teeth part 22c1. Comb-teeth part 22c1 is disposed with constant gaps to drive electrode 35b and monitor electrode 34b.

Movable part 22d has comb-teeth part 22d1. Comb-teeth part 22d1 is disposed with constant gaps to sense electrode 36a and sense drive electrode 37a.

Movable parts 22e to 22h are connected to weight 24b via springs 28. Movable parts 22e to 22h are disposed to surround weight 24b.

Movable part 22e has comb-teeth part 22e1. Comb-teeth part 22e1 is disposed with constant gaps to drive electrode 35c and monitor electrode 34c.

Movable part 22f has comb-teeth part 22f1. Comb-teeth part 22f1 is disposed with constant gaps to sense electrode 36c and sense drive electrode 37c.

Movable part 22g has comb-teeth part 22g1. Comb-teeth part 22g1 is disposed with constant gaps to drive electrode 35d and monitor electrode 34d.

Movable part 22h has comb-teeth part 22h1. Comb-teeth part 22h1 is disposed with constant gaps to sense electrode 36d and sense drive electrode 37d.

Drive electrode 35a applies an electrostatic force to comb-teeth part 22a1. Drive electrode 35b applies an electrostatic force to comb-teeth part 22c1. This causes movable part 22a and movable part 22c to vibrate in the Y-axis direction. The vibrations of movable part 22a and movable part 22c are transferred to weight 24a via springs 28, and weight 24a therefore vibrates in the Y-axis direction.

Drive electrode 35c applies an electrostatic force to comb-teeth part 22e1. Drive electrode 35d applies an electrostatic force to comb-teeth part 22g1. This causes movable part 22e and movable part 22g to vibrate in the Y-axis direction. The vibrations of movable part 22e and movable part 22g are transferred to weight 24b via springs 28, and weight 24b therefore vibrates in the Y-axis direction.

Weight 24a vibrates in the Y-axis direction as described above. When an angular velocity is applied while weight 24a is vibrating, a Coriolis force acts on weight 24a; therefore, a vibration of weight 24a is generated in an X-axis direction. This vibration in the X-axis direction causes movable part 22b and movable part 22d to vibrate in the X-axis direction.

Weight 24b vibrates in the Y-axis direction as described above. When an angular velocity is applied while weight 24b is vibrating, a Coriolis force acts on weight 24b; therefore, a vibration of weight 24b is generated in the X-axis direction. This vibration in the X-axis direction causes movable part 22f and movable part 22h to vibrate in the X-axis direction.

Regarding sense electrode 36a and sense electrode 36b, the vibrations of movable part 22b and movable part 22d in the X-axis direction change the gaps between sense electrodes 36a, 36b and comb-teeth parts 22b1, 22d1. The changes in the gaps are detected by a detection circuit to be described later. As a result, an angular velocity can be detected.

Regarding sense electrode 36c and sense electrode 36d, the vibrations of movable part 22f and movable part 22h in the X-axis direction change the gaps between sense electrodes 36c, 36d and comb-teeth parts 22f1, 22h1. The changes in the gaps are detected by a detection circuit to be described later. As a result, an angular velocity can be detected.

Fixed parts 32a to 32d support the members via springs 28.

Figure 3:
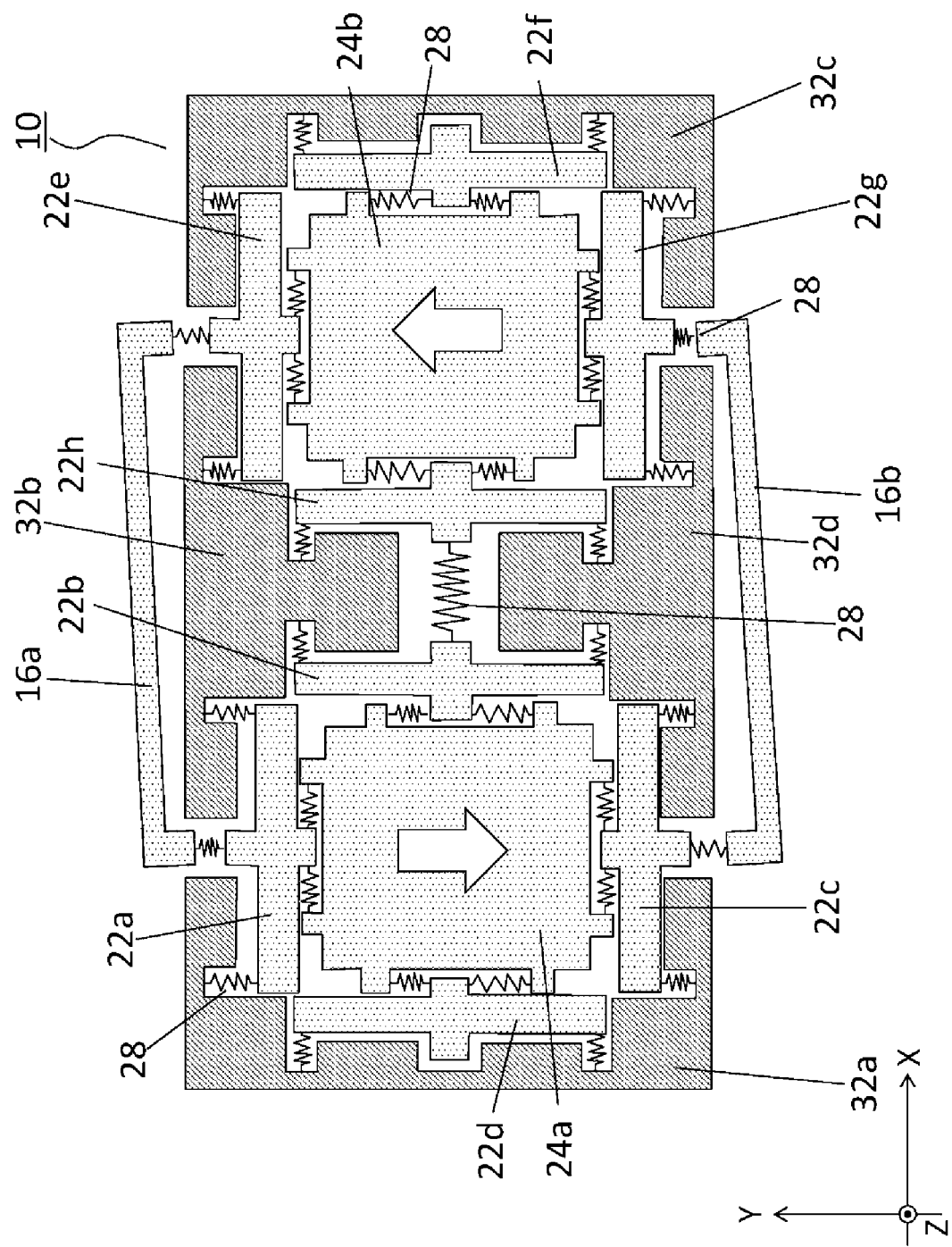
FIG. 3 is a diagram showing a drive operation of the above angular velocity sensor element.

FIG. 3 is a diagram showing a drive operation of the angular velocity sensor element. Note that, regarding the hatched parts, the filled parts, and the symbols representing springs 28 in FIG. 3 are shown in FIG. 8. Further, the outlined white arrows in FIG. 3 represent directions of forces.

Drive electrode 35a generates an electrostatic force on comb-teeth part 22a1 by applying a drive voltage from a drive circuit to be described later. Drive electrode 35b generates an electrostatic force on comb-teeth part 22c1 by applying a drive voltage from the drive circuit to be described later. By making the drive voltages applied to drive electrode 35a and drive electrode 35b have opposite phases to each other, there occurs a change in balance between the electrostatic forces, and weight 24a therefore vibrates in the Y-axis direction.

Drive electrode 35c generates an electrostatic force on comb-teeth part 22e1 by applying a drive voltage from the drive circuit to be described later. Drive electrode 35d generates an electrostatic force on comb-teeth part 22g1 by applying a drive voltage from the drive circuit to be described later. By making the drive voltages applied to drive electrode 35c and drive electrode 35d have opposite phases to each other, there occurs a change in balance between the electrostatic forces, and weight 24b therefore vibrates in the Y-axis direction.

At this time, by making the drive voltages applied to drive electrode 35a and drive electrode 35c have the same phase, weight 24a and weight 24b vibrate in the same phase; and by making the drive voltages applied to drive electrode 35a and drive electrode 35c have opposite phases to each other, weight 24a and weight 24b vibrate in opposite phases to each other.

Figure 4:
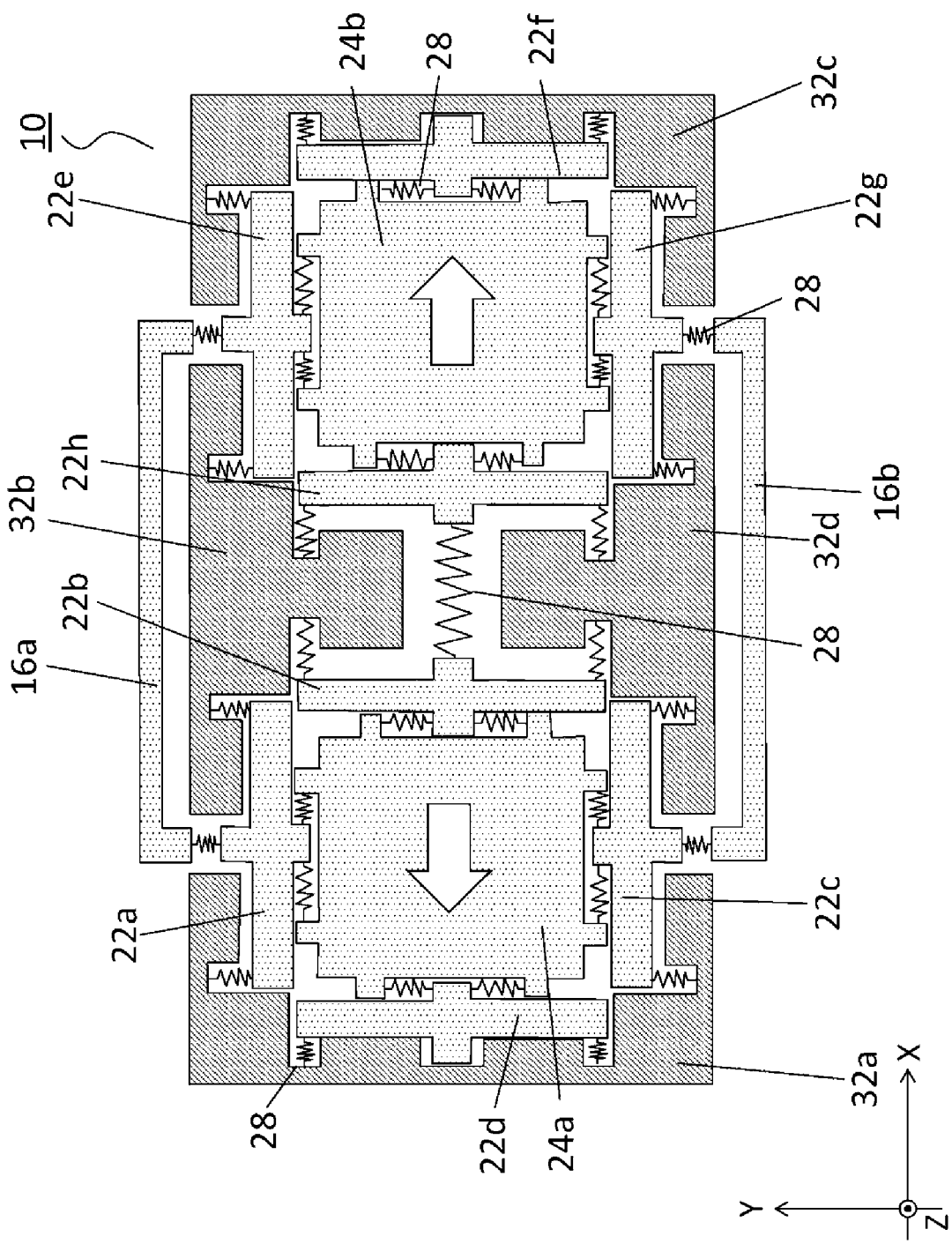
FIG. 4 is a diagram showing a detection operation of the above angular velocity sensor element.

FIG. 4 is a diagram showing a detection operation of the angular velocity sensor element. Note that, regarding the hatched parts, the filled parts, and the symbols representing springs 28 in FIG. 4 are shown in FIG. 8. Further, the outlined white arrows in FIG. 4 represent directions of forces.

When an angular velocity is applied in a vertical direction (Z-axis) from outside to weight 24a and weight 24b vibrating in the Y-axis direction by the electrostatic forces due to the drive voltages, a Coriolis force acts in the perpendicular direction (X-axis), and weight 24a and weight 24b therefore vibrate in the X-axis direction.

When weight 24a starts to vibrate in the X-axis direction, changes occur in the gaps between comb-teeth parts 22b1, 22d1 and sense electrodes 36a, 36b. These changes in the gaps are detected as a change in capacitance by a detection circuit to be described later.

When weight 24b starts to vibrate in the X-axis direction, changes occur in the gaps between comb-teeth parts 22f1, 22h1 and sense electrodes 36c, 36d. These changes in the gaps are detected as a change in capacitance by a detection circuit to be described later.

Figure 5:
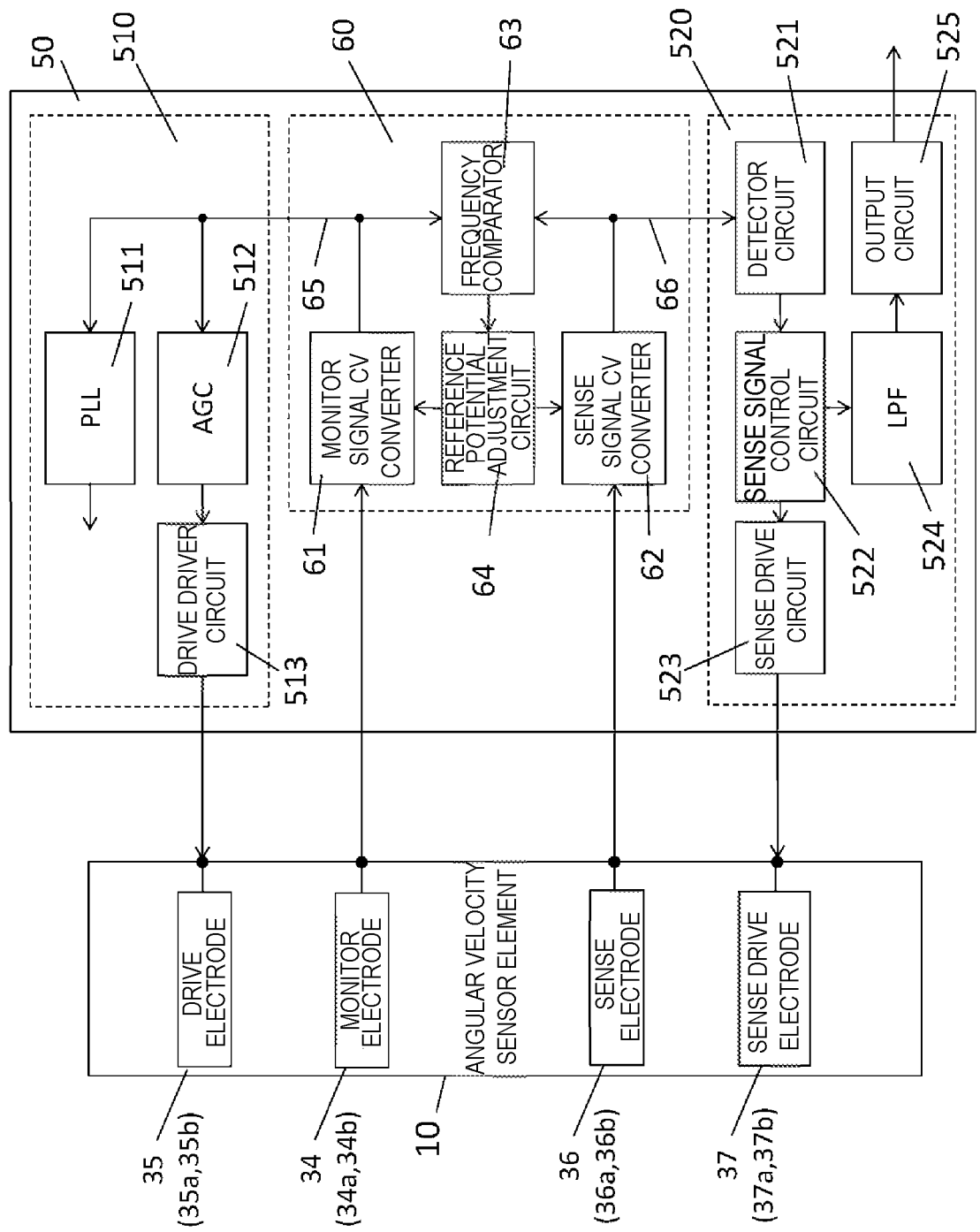
FIG. 5 is a block diagram showing a drive circuit and a detection circuit connected to the above angular velocity sensor element.

FIG. 5 is a block diagram showing drive circuit 510 and detection circuit 520 of the angular velocity sensor. Drive circuit 510 drives weight 24a and weight 24b. Detection circuit 520 detects displacements, of weight 24a and weight 24b of angular velocity sensor, caused by a Coriolis force.

Control circuit 50 is constructed by reference potential supply circuit 60, drive circuit 510, and detection circuit 520.

Reference potential supply circuit 60 has monitor signal CV converter 61, sense signal CV converter 62, frequency comparator 63, and reference potential adjustment circuit 64.

Monitor signal CV converter 61 is connected to angular velocity sensor element 10 through monitor electrode 34b, and when angular velocity sensor element 10 vibrates in the Y-axis direction, monitor signal CV converter 61 detects a change in capacitance caused between the monitor electrodes and the comb-teeth parts, and converts the monitor capacitance into monitor signal 65 that is a voltage value depending on the capacitance change.

Sense signal CV converter 62 is connected to angular velocity sensor element 10 through sense electrodes 36; and when angular velocity sensor element 10 vibrates in the X-axis direction, sense signal CV converter 62 detects a change in capacitance caused between sense electrodes 36 and comb-teeth parts, and converts a sense capacitance into sense signal 66 that is a voltage signal depending on the capacitance change.

Frequency comparator 63 compares frequencies of monitor signal 65 and sense signal 66 with each other and sends a control signal depending on the difference between the frequencies to reference potential adjustment circuit 64.

Reference potential adjustment circuit 64 changes a reference potential for monitor signal CV converter 61 and sense signal CV converter 62, depending on the control signal received from frequency comparator 63.

Drive circuit 510 has PLL (phase locked loop) 511, AGC (auto gain control) 512, and drive driver circuit 513.

PLL 511 detects a phase of monitor signal 65 received from monitor signal CV converter 61 and generates a control signal in phase synchronism with the monitor signal.

AGC 512 detects an amplitude of monitor signal 65 and sends to drive driver circuit 513 a control signal by which an amplitude of a drive signal such that angular velocity sensor element 10 vibrates with a predetermined amplitude.

Drive driver circuit 513 controls an amplitude of the drive voltage, depending on the control signal received from AGC 512, and applies the drive voltage to angular velocity sensor element 10 through drive electrode 35.

Detection circuit 520 has detector circuit 521, sense signal control circuit 522, sense drive circuit 523, LPF (Low Pass Filter) 524, and output circuit 525.

Detector circuit 521 performs synchronous detection on sense signal 66 received from sense signal CV converter 62 based on the control signal in phase synchronism with the monitor signal generated by PLL 511.

Sense signal control circuit 522 converts the detected signal having been synchronously detected by detector circuit 521 into an angular velocity magnitude, and generates a control signal from the angular velocity magnitude to control an amplitude of a sense drive signal such that detection vibration of angular velocity sensor element 10 is restrained.

Sense drive circuit 523 controls an amplitude of a sense drive voltage, depending on the control signal received from sense signal control circuit 522, and applies the sense drive voltage to angular velocity sensor element 10 through sense drive electrode 37.

By passing the angular velocity magnitude obtained by sense signal control circuit 522 through a low-pass filter, LPF 524 converts the detected angular velocity magnitude into an angular velocity signal having only a desired frequency band.

Output circuit 525 performs conversion of an output style on the angular velocity signal obtained by LPF 524 and outputs the converted signal as a sensor signal.

Figure 6:
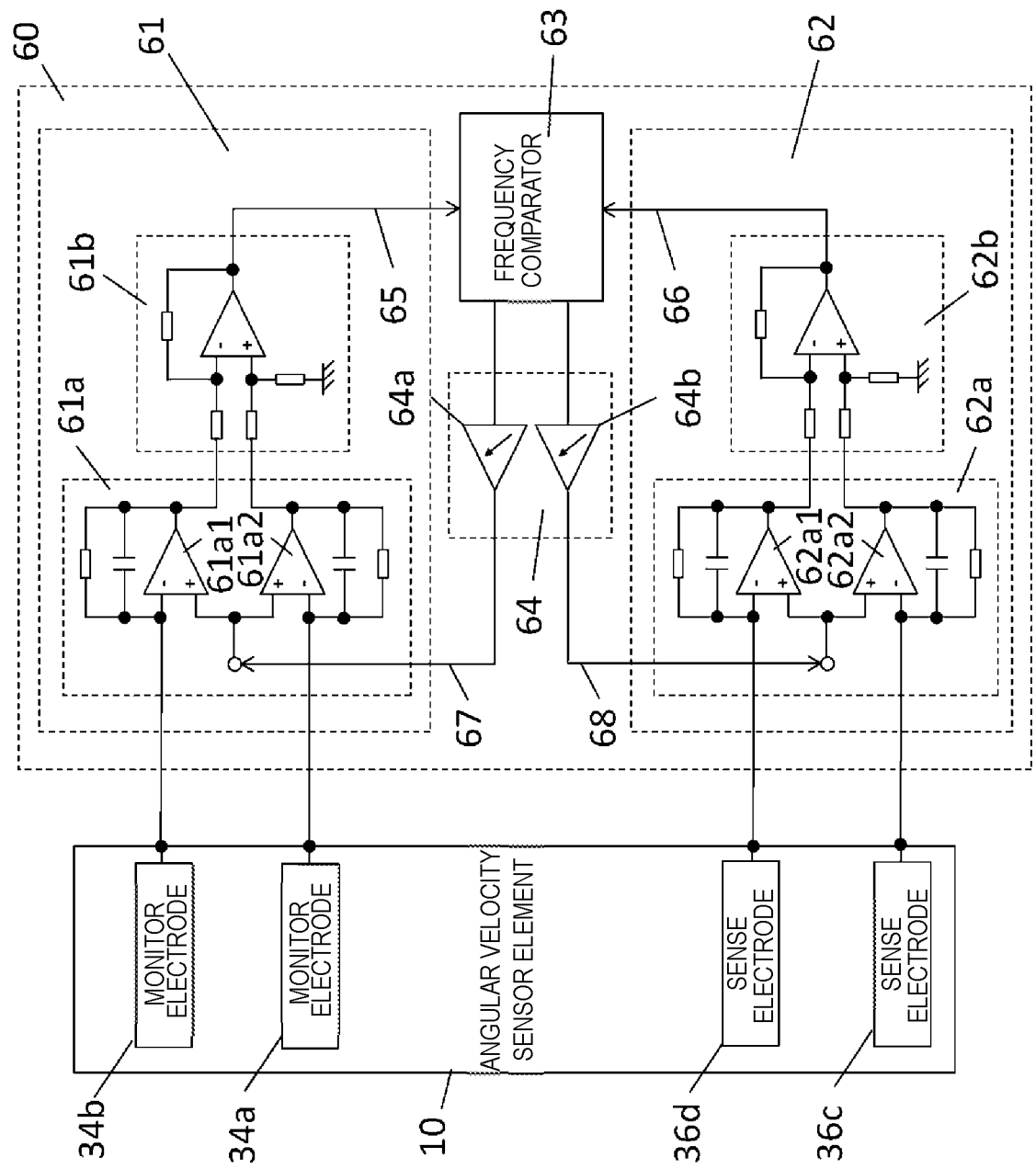
FIG. 6 is a block diagram showing a reference potential supply circuit connected to the above angular velocity sensor element.

FIG. 6 is a block diagram showing a circuit (reference potential supply circuit 60) that supplies a reference potential to the angular velocity sensor element.

Reference potential supply circuit 60 is constituted by monitor signal CV converter 61, sense signal CV converter 62, frequency comparator 63, and reference potential adjustment circuit 64, and monitor signal CV converter 61 has CV conversion circuit 61a and differential amplifier circuit 61b.

CV conversion circuit 61a detects a change in capacitance having occurred between monitor electrodes 34 and comb-teeth parts, and converts the monitor capacitance into a voltage value depending on the capacitance change. CV conversion circuit 61a has amplifier 61a1 and amplifier 61a2. Non-inverting input terminals (terminals denoted by "+" in the drawing) of amplifier 61a1 and amplifier 61a2 are electrically connected to reference potential adjustment circuit 64. An inverting input terminal of amplifier 61a1 is connected to monitor electrode 34b. An inverting input terminal of amplifier 61a2 is connected to monitor electrode 34a.

Differential amplifier circuit 61b differentially amplifies, by a predetermined factor, voltages that are output from CV conversion circuit 61a and have opposite phases, and outputs the amplified voltage as monitor signal 65.

Sense signal CV converter 62 has CV conversion circuit 62a and differential amplifier circuit 62b.

CV conversion circuit 62a detects a change in capacitance having occurred between sense electrodes 36 and comb-teeth parts, and converts the sense capacitance into a voltage value depending on the capacitance change. CV conversion circuit 62a has amplifier 62a1 and amplifier 62a2. Non-inverting input terminals (terminals denoted by "+" in the drawing) of amplifier 62a1 and amplifier 62a2 are electrically connected to reference potential adjustment circuit 64. An inverting input terminal of amplifier 62a1 is connected to sense electrode 36d. An inverting input terminal of amplifier 62a2 is connected to sense electrode 36c.

Differential amplifier circuit 62b differentially amplifies, by a predetermined factor, voltages that are output from CV conversion circuit 62a and have opposite phases, and outputs the amplified voltage as sense signal 66.

Frequency comparator 63 compares frequencies of monitor signal 65 with sensed signal 66 to generate a control signal depending on the difference between the frequencies, and sends the control signal to reference potential adjustment circuit 64.

Reference potential adjustment circuit 64 is configured with amplifiers having variable factors (variable gain amplifier 64a and variable gain amplifier 64b in the drawing), and independently controls each of monitor reference potential 67 and sense reference potential 68 by changing the factors depending on the control signal received from frequency comparator 63.

When monitor reference potential 67 changes, monitor electrodes 34, which are the other input terminals of CV conversion circuit 61a, are brought at the same potential as monitor reference potential 67 due to a feature of an imaginary short circuit. At this time, the voltage differences between monitor electrodes 34 and comb-teeth parts change; therefore, there occur changes in the electrostatic forces. By controlling the changes in the electrostatic forces, it is possible to adjust a vibration frequency of the weight in the Y-axis direction.

When sense reference potential 68 changes, sense electrodes 36, which are the other input terminals of CV conversion circuit 62a, are brought at the same potential as sense reference potential 68 due to a feature of an imaginary short circuit. At this time, the voltage differences between sense electrodes 36 and comb-teeth parts change; therefore, there occur changes in the electrostatic forces. By controlling the changes in the electrostatic forces, it is possible to adjust a vibration frequency of the weight in the X-axis direction.

Here, control is performed in the following manner. Frequency comparator 63 is made to operate to compare frequencies and to generate the control signal so as to cause monitor signal 65 and sense signal 66 to have the same frequency; accordingly, the vibration frequencies of angular velocity sensor element 10 in the X-axis direction and the Y-axis direction are constantly identical to each other. As a result, a vibration efficiency of angular velocity sensor element 10 in the X-axis direction is improved while an angular velocity is being detected, and the angular velocity can be highly accurately detected.

Figure 7:
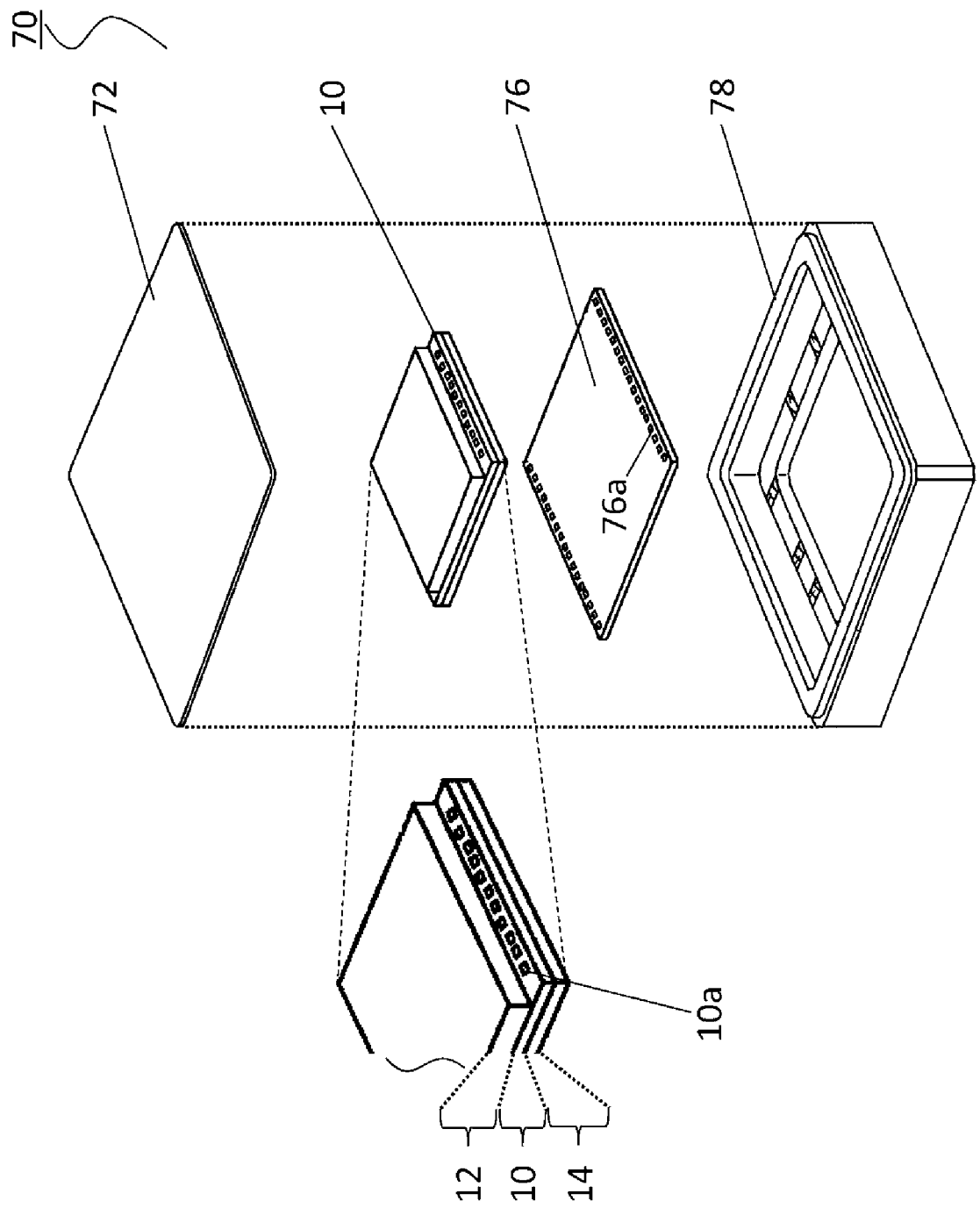
FIG. 7 is a schematic diagram of an angular velocity sensor including the above angular velocity sensor element.

FIG. 7 is a schematic diagram of angular velocity sensor 70 including angular velocity sensor element 10.

Angular velocity sensor 70 includes angular velocity sensor element 10, cap 72, circuit board 76, and package 78.

Angular velocity sensor element 10 is sandwiched between upper lid 12 and lower lid 14. A part of angular velocity sensor element 10 is exposed from upper lid 12, and electrodes 10a are provided on the exposed part. Angular velocity sensor element 10 is disposed on circuit board 76 and is electrically connected to electrodes 76a of circuit board 76 with bonding wires or the like.

Circuit board 76 has the drive circuit, the detection circuit, and the reference potential supply circuit.

Package 78 houses angular velocity sensor element 10 and circuit board 76. Package 78 is, for example, a ceramic package. However, package 78 does not have to be a ceramic package and may be a PCB (Printed Circuit Board).

Cap 72 seals package 78. Cap 72 is, for example, a plate-shaped member. However, cap 72 does not have to be a plate-shaped member and may be resin for molding angular velocity sensor element 10 and circuit board 76.

Note that the technique according to the present exemplary embodiment can be described to be a method of controlling angular velocity sensor 70 including angular velocity sensor element 10 having monitor electrode 34, drive electrode 35, sense electrode 36, and weight 24. The control method includes first to fourth steps. In the first step, a signal from the monitor electrode is capacitance-to-voltage (CV) converted. In the second step, a signal from the sense electrode is CV converted. In the third step, the signal having been CV converted in the first step is compared with the signal having been CV converted in the second step. In the fourth step, a signal to be supplied to the monitor electrode and/or the sense electrode is changed based on a comparison result obtained in the third step. In this case, the fourth step is a step in which the signal to be supplied to the monitor electrode and the signal to be supplied to the sense electrode are independently changed.

The sensor of the present disclosure has high accuracy and is therefore effective as a sensor to be used for steering attitude control of a vehicle, for example.

The invention claimed is:

1. An angular velocity sensor comprising:
   an angular velocity sensor element including:
   a monitor electrode;
   a drive electrode;
   a sense electrode; and
   a weight;
   a drive circuit that drives the weight by applying an electric signal to the drive electrode;
   a detection circuit that receives an electric signal generated by displacement of the weight from the sense electrode; and
   a reference potential supply circuit that supplies a reference potential to the angular velocity sensor element,
   wherein the reference potential supply circuit includes:
   a first capacitance-to-voltage (CV) converter connected to the monitor electrode;
   a second CV converter connected to the sense electrode;
   a comparator that compares a frequency of a signal being output from the first CV converter with a frequency of a signal being output from the second CV converter and outputs a signal depending on a result of the comparison; and
   a reference potential adjustment circuit that receives the signal depending on the result of the comparison and outputs the signal to the first CV converter or the second CV converter.

2. The angular velocity sensor according to claim 1, wherein
   the first CV converter has a first amplifier and a second amplifier,
   the second CV converter has a third amplifier and a fourth amplifier, and
   a non-inverting input terminal of each of the first amplifier and a non-inverting input terminal of the second amplifier receives the signal from the reference potential adjustment circuit.

3. The angular velocity sensor according to claim 2, wherein
   the monitor electrode has a first monitor electrode and a second monitor electrode,
   to an inverting input terminal of the first amplifier, a signal from the first monitor electrode is input, and
   to an inverting input terminal of the second amplifier, a signal from the second monitor electrode is input.

4. The angular velocity sensor according to claim 2, wherein
   the sense electrode has a first sense electrode and a second sense electrode,
   to an inverting input terminal of the third amplifier, a signal from the first sense electrode is input, and
   to an inverting input terminal of the fourth amplifier, a signal from the second sense electrode is input.

5. The angular velocity sensor according to claim 2, wherein
   the reference potential adjustment circuit has a first variable gain amplifier and a second variable gain amplifier,
   an output from the first variable gain amplifier is input to the non-inverting input terminal of the first amplifier and the non-inverting input terminal of the second amplifier, and
   an output from the second variable gain amplifier is input to a non-inverting input terminal of the third amplifier and a non-inverting input terminal of the fourth amplifier.

6. An angular velocity sensor comprising:
an angular velocity sensor element having:
  a monitor electrode;
  a drive electrode;
  a sense electrode; and
  a weight; and
a circuit electrically connected to the monitor electrode, the drive electrode, and the sense electrode,
wherein the circuit has:
  a first CV converter connected to the monitor electrode;
  a second CV converter connected to the sense electrode;
  a comparator that a signal from the first CV converter and a signal from the second CV converter are input to; and
  an output circuit that a signal from the comparator is input to and that outputs a signal to the first CV converter or the second CV converter.

7. The angular velocity sensor according to claim 6, wherein
  the first CV converter has a first amplifier and a second amplifier,
  the second CV converter has a third amplifier and a fourth amplifier, and
  the first amplifier and the second amplifier are connected to the output circuit.

8. The angular velocity sensor according to claim 7, wherein
  the monitor electrode has a first monitor electrode and a second monitor electrode,
  the first amplifier is connected to the first monitor electrode, and
  the second amplifier is connected to the second monitor electrode.

9. The angular velocity sensor according to claim 7, wherein
  the sense electrode has a first sense electrode and a second sense electrode,
  the third amplifier is connected to the first sense electrode, and
  the fourth amplifier is connected to the second sense electrode.

10. The angular velocity sensor according to claim 7, wherein
  the output circuit has a first variable gain amplifier and a second variable gain amplifier,
  the first variable gain amplifier is connected to the first amplifier and the second amplifier, and
  the second variable gain amplifier is connected to the third amplifier and the fourth amplifier.

11. A method for controlling an angular velocity sensor including an angular velocity sensor element, the angular velocity sensor element including a monitor electrode, a drive electrode, a sense electrode, and a weight, the method comprising:
  a first step of CV converting a signal from the monitor electrode;
  a second step of CV converting a signal from the sense electrode;
  a third step of comparing the signal having been CV converted in the first step with the signal having been CV converted in the second step; and
  a fourth step of changing a signal to be supplied to the monitor electrode or the sense electrode, based on a result of the comparison obtained in the third step.

12. The method for controlling an angular velocity sensor according to claim 11, wherein in the fourth step, the signal to be supplied to the monitor electrode and the signal to be supplied to the sense electrode are independently changed.

* * * * *